(12) United States Patent
Ramos et al.

(10) Patent No.: US 8,774,138 B2
(45) Date of Patent: Jul. 8, 2014

(54) TRANSPORT FORMAT SELECTION IN ENHANCED UL

(75) Inventors: Edgar Ramos, Espoo (FI); Mats Sagfors, Kyrkslatt (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 183 days.

(21) Appl. No.: 12/747,281

(22) PCT Filed: Dec. 13, 2007

(86) PCT No.: PCT/SE2007/050985
§ 371 (c)(1),
(2), (4) Date: Jun. 10, 2010

(87) PCT Pub. No.: WO2009/075624
PCT Pub. Date: Jun. 18, 2009

(65) Prior Publication Data
US 2010/0272075 A1    Oct. 28, 2010

(51) Int. Cl.
G08C 17/00 (2006.01)
H04W 4/00 (2009.01)
H04J 3/00 (2006.01)
H04J 3/06 (2006.01)

(52) U.S. Cl.
USPC ........... 370/336; 370/311; 370/328; 370/338; 370/350

(58) Field of Classification Search
None
See application file for complete search history.

(56) References Cited

U.S. PATENT DOCUMENTS

| 2004/0185892 A1* | 9/2004 | Iacono et al. | 455/522 |
| 2006/0092876 A1* | 5/2006 | Kwak et al. | 370/329 |
| 2007/0036112 A1* | 2/2007 | Chen | 370/335 |
| 2007/0047451 A1* | 3/2007 | Lohr et al. | 370/242 |
| 2008/0130488 A1* | 6/2008 | Kuo | 370/216 |
| 2008/0132230 A1* | 6/2008 | Marinier et al. | 455/434 |

FOREIGN PATENT DOCUMENTS

| EP | 1509011 A2 | 2/2005 |
| EP | 1 748 593 A1 | 1/2007 |
| EP | 1748593 A1 | 1/2007 |
| WO | 2006067570 A1 | 6/2006 |
| WO | 2006118831 A2 | 11/2006 |

OTHER PUBLICATIONS

"An Introduction to HSUPA Concepts and RF Measurements", Agilent Technologies, Jul. 18, 2007, http://www.korea.tm.agilent.com/events/CTW2007/data/A_1.pdf, slides 4-6; abstract, 36 pages.
Chen, T., et al., "Uplink DPCCH Gating of Inactive UEs in Continuous Packet Connectivity Mode for HSUPA", Wireless Communications and Networking Conference, 2007 WCNC, IEEE, Mar. 11-15, 2007, pp. 1686-1691.
European Search Report mailed on Aug. 16, 2013, in corresponding European Application No. 07852256.2-1854/2220778, 4 pages.

* cited by examiner

*Primary Examiner* — Faruk Hamza
*Assistant Examiner* — Diane Lo
(74) *Attorney, Agent, or Firm* — Rothwell, Figg, Ernst & Manbeck, P.C.

(57) ABSTRACT

In a method and a device for selecting transport format in a User Equipment transmitting data in a cellular radio system using an Enhanced Uplink (EUL) with Discontinuous Reception (DRX) the determination of whether or not to transmit data in the next Transmission Time Interval (TTI) is based on the amount of data in the User Equipment transmission buffer.

13 Claims, 3 Drawing Sheets

TRANSPORT FORMAT SELECTION IN ENHANCED UL

CROSS-REFERENCE TO RELATED APPLICATION

This application is a 35 U.S.C. §371 National Phase Application from PCT/SE2007/050985, filed Dec. 13, 2007, and designating the United States.

TECHNICAL FIELD

The present invention relates to a method and a device for scheduling and transmitting data in a cellular radio system.

BACKGROUND

Recently, the specifications for High Speed Packed Access (HSPA) have included Discontinuous Transmission (DTX) and Discontinuous Reception (DRX) in the context of the Continuous Packet Connectivity (CPC) functionality, see the standards third generation partnership project (3GPP) TS 25.308 "High Speed Downlink Packet Access (HSDPA); Overall description; Stage 2". Rel-7, version 7.2.0 and 3GPP TR 25.903 Continuous Packet Connectivity (CPC) for Packet Data Users, Release 7. The deployment of DTX and DRX in HSPA is motivated by i.a. power saving and reduction of the Uu instantaneous interference. The Uu interface provides interconnection between the Radio Network Controller (RNC) and User Terminal via the Node B.

Furthermore, on Medium Access Control (MAC) level, the DRX functionality as described in the standard TS 25.308 can be used for frame bundling. The result of the inclusion of DRX on the MAC level is that:

The DTX functions are active as a pre-condition
The User Equipment (UE) is forced to buffer certain quantity of Radio Link Control (RLC) Protocol Data Units (PDUs) which are expected to be received in regular time intervals
The PDUs are deployed in big size transport formats in few Transmission Time intervals (TTIs)
Transmission is stopped when buffering, and
Retransmissions are allowed at any time.

The Enhanced Uplink (EUL) DRX works by restricting the start of Enhanced-Dedicated Channel (E-DCH) transmissions to a cycle pattern. The cycle pattern is called MAC_DTX_cycle and the beginning of the cycle coincides with the beginning of the UE_DTX_cycle_1 specified to support the DTX functionality. The values of these cycles are signaled to the UE using a Radio Resource Control Protocol (RRC).

The transmissions are restricted when it has passed a configurable number of TTIs called UE_Inactivity_Threshold where the UE have not had a transmission (for example, because its buffer is empty). Then the UE does not transmit again until a new MAC_DTX_cycle starts. The UE_Inactivy_Threshold is signaled to the UE by RRC. The values for the UE_Inactivy_Threshold allowed by TS 25.331 in Release 7 (10.3.6.34a) are in the range from 0 to 512.

In addition, to start the transmission a configurable offset is applied. The offset is called UE_DTX_DRX_Offset which is RRC signaled to the UE.so that new transmission can be performed after the offset has being applied to the time of the beginning of the cycle, if there is need for one.

If a UE has transmitted in one E-DCH Transmission Time Interval (TTI), then the UE is allowed to use subsequent TTIs for E-DCH transmission as long as its transmission is continued (re-started) within UE_Inactivity_Threshold TTIs. In other word the UE can transmit continuously without being interrupted by the DRX feature. But if the UE stops the transmissions by the same number of TTIs that is configured with the threshold value, then the UE can not transmit even when it has data in the buffer until the condition for transmitting is fulfill again.

If there is need for Hybrid Automatic Repeat Request (HARQ) retransmissions, those can be done in the correspondent HARQ process without being affected by the DRX model, independently of the value of the Inactivity threshold and the current UE activity. An exemplary transmission performed in accordance with the existing transmission protocol is illustrated in FIG. 1.

With the current DRX specified functionality, some frame bundling can be achieved with the correct tuning of the parameters: UE_Inactivity_threshold and MAC_DTX_CYCLE, especially with 2 ms TTI. But for 10 ms TTI the situation is more difficult, because the longer HARQ RTT and the longer delay between transmission can lead to data received in such a way that restrict the DRX cycles heavily.

Hence there exist a need for a transmission method for EUL DTX that provides a more efficient use of resources and also can achieve an improved transmission.

SUMMARY

It is an object of the present invention to improve the transmission efficiency in a cellular radio system employing a EUL DRX method.

This object and others are obtained by the method and device as set out in the appended claims. Thus, by providing a criterion for the E-DCH Transport Format Selection to deploy EUL DRX based on the status of the MAC buffer instead of an inactivity threshold to stop transmissions an improved use of transmission resources can be obtained.

In accordance with the invention a method of selecting transport format in a User Equipment transmitting data in a cellular radio system using an Enhanced Uplink (EUL) with Discontinuous Reception (DRX) and Discontinuous Transmission (DTX) is provided. The method comprises the step of determining whether or not to transmit data in the next Transmission Time Interval (TTI) based on the amount of data in the User Equipment transmission buffer.

In accordance with one embodiment the transmission is stopped for the next TTI if the buffer will be emptied in the next transmission for which the transport format selection was just performed.

In accordance with one embodiment, the maximum number of continuous transmissions can be limited, thereby limiting the transmissions to a maximum number after the starting of the transmission cycle.

The invention further extends to a User Equipment (UE) configured to transmit in accordance with the method of the present invention.

In accordance with the invention, less interference is caused when several UEs are transmitting simultaneously in the case of a possible Time Division Multiplexing (TDM) scheduling. In addition there will be a more efficient and flexible handling of the transmission buffers of the UEs resulting in power saving and also a better network control over the UE transmissions.

BRIEF DESCRIPTION OF THE DRAWINGS

The present invention will now be described in more detail by way of non-limiting examples and with reference to the accompanying drawings, in which.

DETAILED DESCRIPTION

Figure 1:
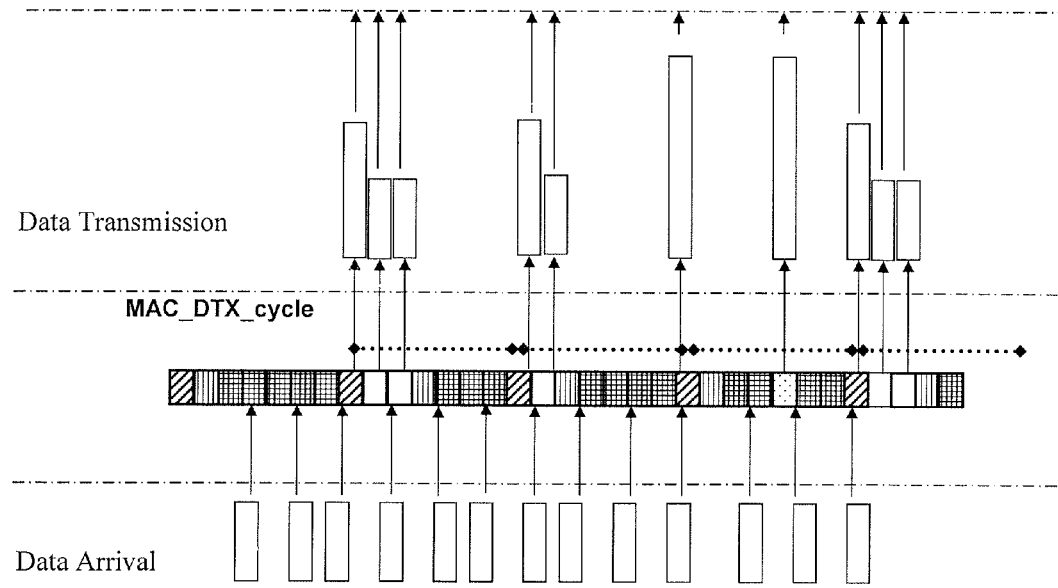
FIG. 1 is a view illustrating a transmission sequence.
Figure 2:
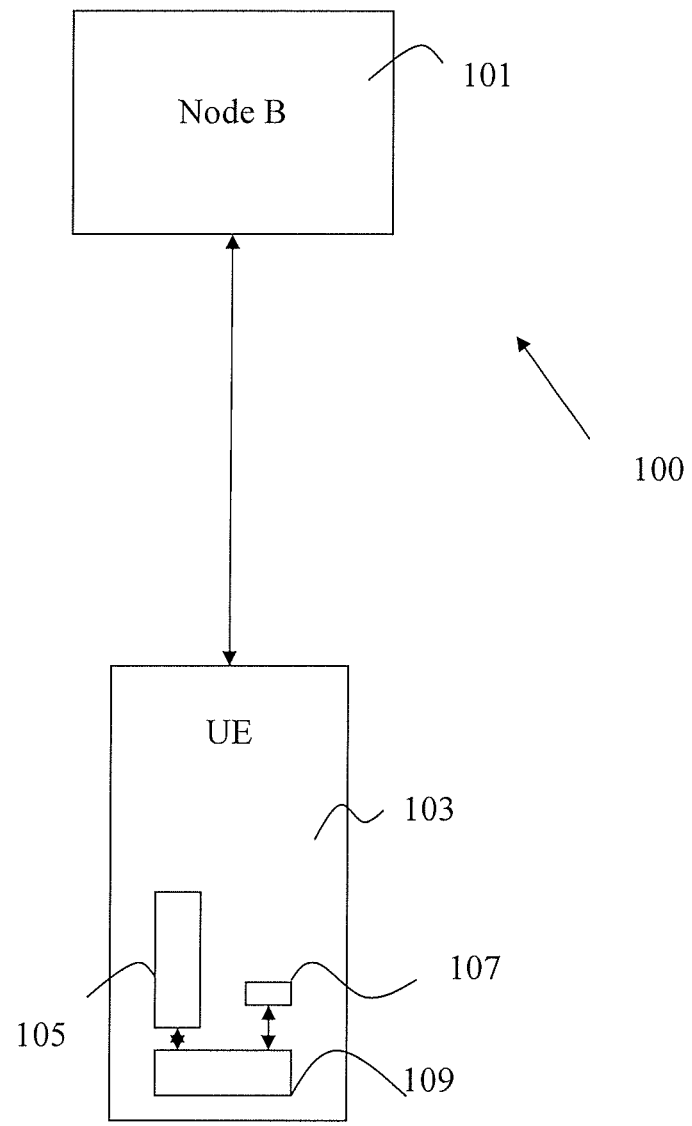
FIG. 2 is a view of a cellular radio system.

In FIG. 2 a partial view of a cellular radio system 100 is shown. The radio system comprises a number of User Equipments (UEs) 103. In order to simplify the view in FIG. 2, only one UE 103 is shown. The UEs 103 can connect to the radio network over an air interface via a radio bade station 101, typically denoted Node-B. The UE 103 comprises means 105 for selecting transport format for transmission of data stored in a buffer 107. The UE can further comprise a control unit 109 configured to control transport format selection and transmission.

According to the current specifications, the inactivity threshold value must be >0 to be able to use the DRX functionality. This means that the UE has to have at least one TTI without transmission to enter the non-transmitting part of the cycle. This can be sometimes inconvenient.

Thus, when 10 ms TTI is in use, the UE implementation of the threshold can bring some misalignments between the network and the UE on when a transmission has to be done or not. Timing misalignment of the higher layers could deliver data to the buffer in unexpected times.

Also using the currently adopted functionality for frame bundling is inconvenient for 10 ms TTI, a relatively long HARQ Round Trip Time (RTT) and a relatively long delay between transmissions can lead to data being received in such a way that it restrict the DRX cycles heavily.

Moreover, in the current standard, there is not any limitation for the number of TTIs that the UE Can deploy to transmit once it is transmitting without reaching the number of TTIs specified by the inactivity threshold when it does not need to transmit. In this way there is not any tool for the network to stop the transmissions by othermeans than by sending an Absolute Grant for a 0 kbps rate. In some cases, the network might need to limit the number of TTIs used for transmissions by the UE, based in priorities, bitrates and traffic models.

In order to improve the transmission from the UE 103, the UE 103 can be configured to signal that it will empty its buffer during the transport format selection for the next transmission. This can be defined as an empty buffer state. Such a state is reset after the next Transport Format Selection function is executed. In accordance with one embodiment an empty state may also include a buffer threshold value that provides the minimum of data that MAC needs to have in its buffer to not being considered empty. If the buffer is emptied in a TTI a new transmission is not scheduled for the next TTI even if new data arrives in within the TTI when the buffer is emptied.

In accordance with one embodiment of the present invention, the number of consecutive TTIs used for E-DCH transmissions by the UE 103 can be limited. In a preferred embodiment the number of consecutive TTIs used for E-DCH transmissions is signaled to a UE using a Radio Resource Control (RRC) message or signaled in-band. In particular it is preferred that the total time used for all the possible consecutive transmissions is less than MAC_DTX_Cycle.

Figure 3:
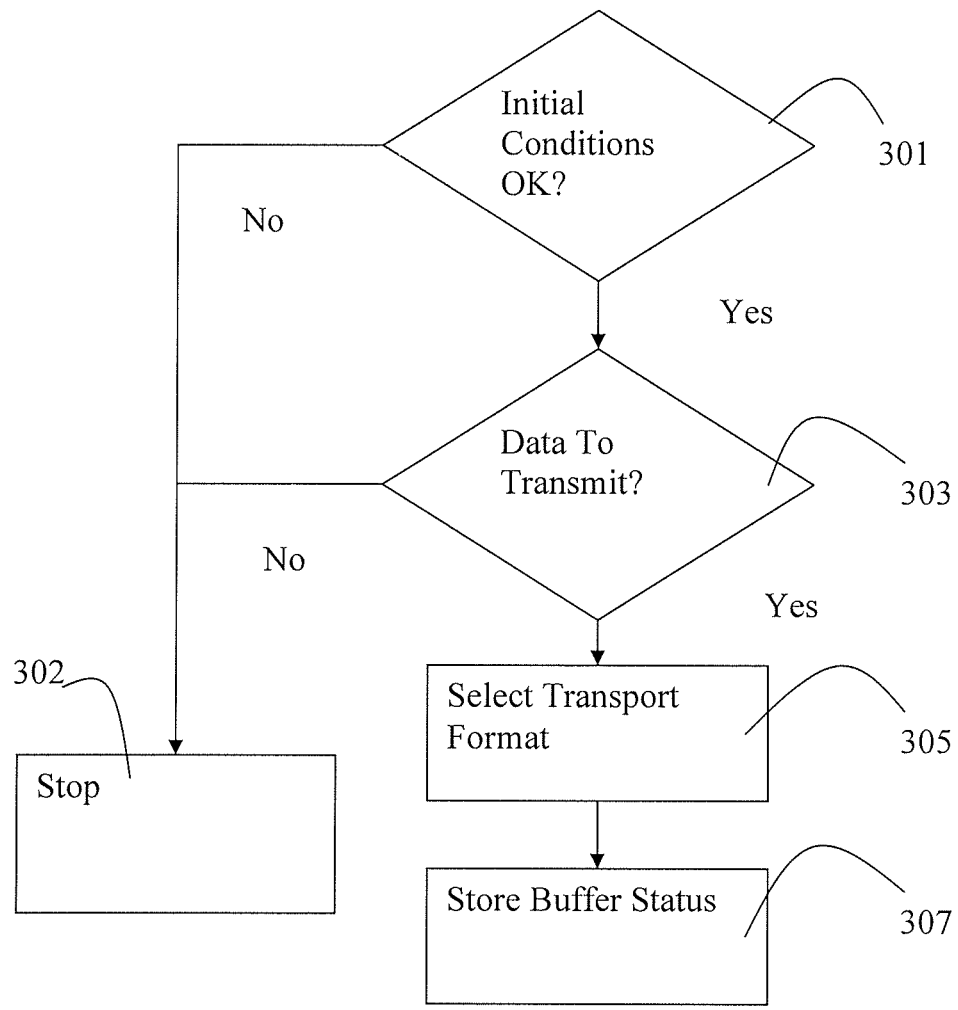
FIG. 3 is a flowchart illustrating steps performed in a procedure for transmitting data.

In accordance with one embodiment, by configuring the UE_Inactivity_Threshold to 0 the UE can be configured to perform the procedure described in FIG. 3.

First in a step 301 it is checked if the UE is limited in transmission power, has a serving grant >0, is able to deploy the current HARQ process, and there are no pending retransmissions. If all the conditions in step 301 are fulfilled the procedure proceeds to a step 303, else the procedure stops in a step 302.

In step 303 it is checked if there is data to transmit. If there is data to transmit the procedure proceeds to a step 305. If there is no data to transmit the procedure stops in the step 302.

In step 305 a transport format selection is performed by the UE if:
  it is the time to transmit given by the beginning of the cycle plus the offset; or
  the UE has not emptied the buffer in the previous transport format selection for the transmission of the previous TTI and it has not reach the maximum number of continuous transmissions If any of these conditions are true, the UE will proceed to do the transport format selection for the next transmission, otherwise no transport format selection is executed, and as a consequence thereof no transmission takes place.

Once the Transport Format is selected, the status of the buffer is verified and stored in a step 307 for the next attempt to perform the transport format selection in the next TTI.

Using the transmission scheduling as described herein above transmission power can be saved. This is particularly true when the data arrival is discontinuous but constant because power can be saved since the data buffered will be sent in bigger transport formats in few transmissions instead of using smaller transport formats with more transmissions.

In yet another embodiment, a further reduction of interference can be obtained by reducing the number of TTIs when different UEs are transmitting simultaneously. This can be obtained by configuring the network to synchronize the TTIs when different UEs are allowed to transmit in the Uplink.

By signaling the maximum number of transmissions to a UE using for example using RRC it is possible to let different UEs transmit at different times by a limited amount of TTIs. This will allow for a more efficient scheduling and utilization of the E-DCH channel and also a reduction in the Uu interference. Also it provides the network with a tool for restricting the number of transmissions that a UE is allowed to perform.

In the current MAC spec TS. 25.321 version 7.2.0, the enhanced-transport format combination (E-TFC) selection is performed as follows:
  11.8.1.4 E-TFC Selection
    In FDD, in case the DTX feature is configured by higher layers and no E-DCH transmission is performed in this TTI:
      if MAC Inactivity Threshold>1 and no E-DCH transmission has been performed for MAC Inactivity Threshold−1 previous TTIs or,
      if MAC Inactivity Threshold=1:
        E-TFC selection shall only be performed for the TTIs where the following conditions are fulfilled:
          For 2 ms TTI: [5*CFN+subframe number−UE DTX DRX Offset] mod MAC DTX Cycle=0;
          For 10 ms TTI: [5*CFN−UE DTX DRX Offset] mod MAC DTX Cycle=0

In an exemplary embodiment the specification can instead be changed to:
  In FDD, in case the DTX feature is configured by higher layers:
    E-TFC selection shall only be performed for the TTIs where the following conditions are fulfilled:
      if MAC Inactivity Threshold>0 and E-DCH transmission has taken place during any previous consecutive TTI in the range given by MAC_Inactivity_Threshold, or If
   For 2 ms TTI: [5*CFN+subframe number−UE DTX DRX Offset] mod MAC DTX Cycle=0;
   For 10 ms TTI: [5*CFN−UE DTX DRX Offset] mod MAC DTX Cycle=0

In another exemplary embodiment, the specification text can be as follows:

. . .

In FDD, in case the DTX feature is configured by higher layers:
  E-TFC selection shall only be performed for the Ilk where the following conditions are fulfilled:
    if MAC Inactivity Threshold>0 and E-DCH transmission has taken place during any previous consecutive TTI in the range given by MAC_Inactivity_, or
    if MAC Inactivity Threshold=0 and the UE was not able to empty its buffer with the Transport Format Selection for the transmission of the previous TTI, or.
  If
   For 2 ms TTI: [5*CFN+subframe number−UE DTX DRX Offset] mod MAC DTX Cycle=0;
   For 10 ms TTI: [5*CFN−UE DTX DRX Offset] mod MAC DTX Cycle=0

If a constraint is enforced on the maximum number of consecutive transmissions in the MAC specification the specification can be as follows:

In FDD, in case the DTX feature is configured by higher layers:
  E-TFC selection shall only be performed for the TTIs where the following conditions are fulfilled.
   If the number of previous consecutive TTIs with EDCH transmissions is less than UE_MAX_Cont_Tx, and
    if MAC Inactivity Threshold>0 and E-DCH transmission has taken place during any previous consecutive TTI in the range given by MAC_Inactivity_Threshold, or
    if MAC Inactivity Threshold=0 and the UE was not able to empty its buffer with the Transport Format Selection for the transmission of the previous TTI, or.
  If:
   For 2 ms TTI: [5*CFN+subframe number−UE DTX DRX Offset] mod MAC DTX Cycle=0;
   For 10 ms TTI: [5*CFN−UE DTX DRX Offset] mod MAC DTX Cycle=0

The addition of UE_MAX Cont_Tx can be included in the RRC spec 3GPP TS 25.331 Radio Resource Control (RRC) Protocol Specification Release 7, Version 7.4.0. Finally the buffer threshold can be also included if need it to define a customized minimum quantity of data when the UE should consider the buffer as not being empty. Such a definition can be done also in the MAC spec without any changes being required.

The invention claimed is:

1. A method of determining when to perform a transport format selection procedure in a User Equipment (UE) transmitting data in a cellular radio system using an Enhanced Uplink (EUL), where the User Equipment supports Discontinuous Transmission (DTX) and Discontinuous Reception (DRX), the method comprising the steps of:
(a) determining an amount of data in a transmission buffer of the UE;
(b) determining whether to perform a transport format selection procedure in a next Transmission Time Interval (TTI), wherein the determination is based on the determined amount of data in the UE transmission buffer; and
(c) limiting the number of consecutive TTIs used for Enhanced Dedicated Channel, E-DCH, DTX transmissions by the UE;
further comprising performing the transport format selection procedure in response to determining that the transport format selection procedure should be performed, wherein the transport selection procedure comprises the steps of:
(i) determining whether a maximum number of continuous transmission has been reached; and
(ii) selecting a transport format after performing the step of determining whether the maximum number of continuous transmission has been reached.

2. The method according to claim 1, wherein the number of consecutive TTIs used for transmissions is signaled to the UE in a Radio Resource Control (RRC) message.

3. The method according to claim 1, wherein the total time used for a number of consecutive transmissions is less than a Media Access Control Discontinuous Reception cycle (MAC_DTX_Cycle).

4. The method according to claim 1, wherein transmission is stopped if there is data to transmit for the next TTI if the buffer will be emptied in the next transmission for which the transport format selection was just performed.

5. The method according to claim 1, further comprising the step of setting a User Equipment Inactivity Threshold (UE_Inactivity_Threshold) to 0.

6. The method according to claim 1, wherein the Transmission Time Intervals (TTIs) are synchronized by the network when different User Equipments (UEs) are allowed to transmit in the Uplink.

7. The method of claim 1, wherein
the transport selection procedure further comprises the step of determining whether the transmission buffer was emptied in a previous transport format selection for the transmission of a previous TTI, wherein
the step of selecting the transport format occurs in response to determining that (1) the transmission buffer was not emptied in a previous transport format selection and (2) the maximum number of continuous transmission has not been reached.

8. A User Equipment (UE) for use in a cellular radio system using an Enhanced Uplink (EUL) with Discontinuous Reception (DRX), the UE comprising:
a transport format selector configured to select transport format for transmission in the cellular radio network, wherein the selector is configured to determine whether to perform a transport format selection procedure in a next Transmission Time Interval (TTI) based on an amount of data in a transmission buffer of the UE; and,
a limiter configured to limit the number of consecutive TTIs used for Enhanced Dedicated Channel, E-DCH, DTX transmissions by the UE;
further comprising performing the transport format selection procedure in response to determining that the transport format selection procedure should be performed, wherein the transport selection procedure comprises the steps of:
(i) determining whether a maximum number of continuous transmission has been reached; and
(ii) selecting a transport format after performing the step of determining whether the maximum number of continuous transmission has been reached.

9. The User Equipment according to claim 8, wherein the User Equipment is configured to receive the number of consecutive TTIs used for transmissions in a Radio Resource Control (RRC) message.

10. The User Equipment according to claim 8, wherein that the UE is configured to use a total time for a number of consecutive transmissions that is less than a Media Access Control Discontinuous Reception cycle (MAC_DTX_Cycle).

11. The User Equipment according to claim 8, wherein the User Equipment is configured to stop transmission if there is data to transmit for the next TTI if the buffer will be emptied in the next transmission for which the transport format selection was just performed.

12. The User Equipment according to claim 8, further comprising a controller configured to set a User Equipment Inactivity Threshold (UE_Inactivity_Threshold) of the User Equipment to 0.

13. The User Equipment according to claim 8, wherein the User Equipment is allowed to transmit in the uplink in Transmission Time Intervals (TTIs) determined by the cellular radio system.

* * * * *